United States Patent
Benskin et al.

(10) Patent No.: US 10,063,561 B1
(45) Date of Patent: *Aug. 28, 2018

(54) AUTHENTICATION AND AUTHORIZATION WITHOUT THE USE OF SUPPLICANTS

(71) Applicant: Wells Fargo Bank, N.A., San Francisco, CA (US)

(72) Inventors: Ryan B. Benskin, Charlotte, NC (US); Lawrence T. Belton, Jr., Charlotte, NC (US); Christopher Houser, Mt. Holly, NC (US); Peter A. Makohon, Huntersville, NC (US); Timothy Morris, Lexington, NC (US); Omar Bracey, Glen Allen, VA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,936

(22) Filed: Mar. 27, 2018

Related U.S. Application Data

(63) Continuation of application No. 15/699,341, filed on Sep. 8, 2017, now Pat. No. 9,954,869, which is a
(Continued)

(51) Int. Cl.
*G06F 7/04* (2006.01)
*H04L 29/06* (2006.01)
(Continued)

(52) U.S. Cl.
CPC .......... *H04L 63/102* (2013.01); *H04W 12/06* (2013.01); *H04W 12/08* (2013.01)

(58) Field of Classification Search
CPC .......... H04L 29/06884; H04L 67/2852; H04L 65/1059
(Continued)

(56) References Cited

U.S. PATENT DOCUMENTS

| 7,903,817 | B2 | 3/2011 | Cam-Winget |
| 7,941,853 | B2 | 5/2011 | Rozenberg et al. |

(Continued)

FOREIGN PATENT DOCUMENTS

| EP | 2685752 | 1/2014 |

OTHER PUBLICATIONS

Heo et al, User Demand Prediction from Application Usage Pattern in Virtual Smartphone, 2010, IEEE, pp. 449-455.*
(Continued)

*Primary Examiner* — Luu Pham
*Assistant Examiner* — Jenise Jackson
(74) *Attorney, Agent, or Firm* — Walter | Haverfield LLP; James J. Pingor

(57) ABSTRACT

Provided is authentication and authorization without the use of supplicants. Authentication and authorization includes generating a profile for a device based on at least one characteristic observed during a successful attempt by the device to access an 802.1X network infrastructure. Expected characteristics for a next attempt to access the infrastructure by the device are determined. A characteristic of the next access attempt is matched to the expected characteristic and access to the network is selectively controlled as a result of the matching. This is achieved without a supplicant being installed on the device.

16 Claims, 12 Drawing Sheets

Related U.S. Application Data continuation of application No. 14/658,356, filed on Mar. 16, 2015, now Pat. No. 9,794,265.

(51) Int. Cl.
  *H04W 12/08* (2009.01)
  *H04W 12/06* (2009.01)

(58) Field of Classification Search
  USPC .......................................................... 726/4
  See application file for complete search history.

(56) References Cited

U.S. PATENT DOCUMENTS

| | | | |
|---|---|---|---|
| 8,594,628 B1 | 11/2013 | Schroeder et al. | |
| 8,627,447 B1 | 1/2014 | Chickering | |
| 8,800,044 B2 | 8/2014 | Raad | |
| 8,887,281 B2 | 11/2014 | Honig et al. | |
| 9,330,257 B2 | 5/2016 | Valencia et al. | |
| 9,401,925 B1 | 7/2016 | Guo et al. | |
| 9,479,521 B2 | 10/2016 | Davis et al. | |
| 2004/0250117 A1 | 12/2004 | Congdon | |
| 2007/0180499 A1 | 8/2007 | Van Bemmel | |
| 2007/0240217 A1 | 10/2007 | Tuvell et al. | |
| 2008/0034407 A1* | 2/2008 | Sauter | H04L 63/0272 726/4 |
| 2008/0069105 A1* | 3/2008 | Costa | H04L 63/0853 370/392 |
| 2008/0101240 A1* | 5/2008 | Rohilla | H04L 63/0272 370/236 |
| 2008/0178294 A1 | 7/2008 | Hu et al. | |
| 2008/0201480 A1* | 8/2008 | He | H04L 29/12509 709/227 |
| 2009/0118883 A1 | 5/2009 | Heap et al. | |
| 2009/0158409 A1 | 6/2009 | Khosravi | |
| 2011/0023115 A1 | 1/2011 | Wright | |
| 2011/0023118 A1 | 1/2011 | Wright | |
| 2012/0117622 A1 | 5/2012 | Gronholm et al. | |
| 2012/0144492 A1 | 6/2012 | Griffin | |
| 2012/0216239 A1* | 8/2012 | Yadav | H04L 63/0227 726/1 |
| 2012/0278890 A1 | 11/2012 | Maeaettae | |
| 2013/0103939 A1 | 4/2013 | Radpour | |
| 2013/0167231 A1 | 6/2013 | Raman et al. | |
| 2013/0333002 A1 | 12/2013 | Belton et al. | |
| 2014/0115676 A1 | 4/2014 | Coghlan et al. | |
| 2014/0115703 A1 | 4/2014 | Penton et al. | |
| 2014/0258222 A1 | 9/2014 | Guo et al. | |
| 2014/0337973 A1 | 11/2014 | Foster et al. | |
| 2015/0046984 A1* | 2/2015 | Belton, Jr. | H04L 63/08 726/4 |
| 2015/0067866 A1* | 3/2015 | Ibatullin | G06F 21/554 726/25 |
| 2015/0199512 A1 | 7/2015 | Kim et al. | |
| 2015/0235144 A1 | 8/2015 | Gusev et al. | |
| 2016/0232352 A1 | 8/2016 | Chen et al. | |
| 2016/0239866 A1* | 8/2016 | Gupta | G06Q 30/0235 |

OTHER PUBLICATIONS

Luque et al, Analytical Characterisation of the Performance of Bluetooth Piconets using Serial Port Profile, 2010, ACM, pp. 356-360.*

Demir et al. "Real-Time Protecting Against DDoS Attacks Using Active Gateways", 2005, IEEE, pp. 1-8.

Shiraishi et al. "Port Randomized VPN by Mobile Codes", 2004, IEEE, pp. 671-673.

Srivastava et al. "Advanced Port Knocking Authentication Scheme with QRC using AES", 2011, IEEE, pp. 159-163.

Warren et al. "Implementing and Automating Critical Control 19: Secure Network Engineering for Next Generation Data Center Networks"; STI Joint Written Project, SANS Institute, 79 pages.

Non-Final Office Action for U.S. Appl. No. 14/658,378 dated Dec. 29, 2016, 28 pages.

Notice of Allowance for U.S. Appl. No. 14/658,378 dated Apr. 27, 2017, 14 pages.

* cited by examiner

US 10,063,561 B1

AUTHENTICATION AND AUTHORIZATION WITHOUT THE USE OF SUPPLICANTS

CROSS-REFERENCE TO RELATED APPLICATIONS

This application is a Continuation of pending U.S. patent application Ser. No. 15/699,341 filed Sep. 8, 2017, which is a continuation of U.S. patent application Ser. No. 14/658,356 filed on Mar. 16, 2015 (now U.S. Pat. No. 9,794,265). The entireties of the above-noted applications are incorporated by reference herein.

BACKGROUND

The prevalence of portable network-focused devices, such as Wi-Fi-capable (e.g., 802.1x capable) devices, has increased the difficulty of securing wireless networks. For example, different types or classes of the portable network-focused devices may utilize different operating systems. Each of these different operating systems may utilize different settings and/or may have different capabilities. Accordingly, it is no longer sufficient to account for only a few device types or a few operating systems when a network access control plan is being developed. Further, anti-malware solutions require an internal or third party application to be installed on the user device. On the user side, authentication on a network may be cumbersome and the requirement for software to be deployed on the user device have been blamed for user dissatisfaction. On the network side, the diverse number of devices may make it difficult to identify and manage these devices.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in memory. The computer executable components may include an identification manager component that generates profile data for a device based on the device being authorized to access a secure network. The computer executable components may also include an evaluation component that determines an expected characteristic of a next attempt by the device to access the secure network. Further, the computer executable components may include a validation component that compares a characteristic of the next attempt to the expected characteristic and controls access to the secure network based on the comparison. Further to this aspect, a supplicant is not deployed on the device, wherein a supplicant is a program on the device that communicates with communication infrastructures.

Another aspect relates to a method that may include generating, by a system comprising a processor, a profile for an endpoint based on a characteristic observed during a successful attempt by the endpoint to access a protected communications network, wherein a supplicant is not installed on the endpoint. The method may also include determining, by the system, an expected characteristic for a next attempt by the endpoint to access the protected communications network and comparing, by the system, a characteristic of the next access attempt to the expected characteristic. Further, the method may include selectively controlling, by the system, access to the protected communications network as a result of the comparing.

Yet another aspect relates to a computer-readable storage device storing executable instructions that, in response to execution, cause a system comprising a processor to perform operations. The operations may include generating profile data for a device based on the device being authorized to access a secure network and determining an expected characteristic of a next attempt by the device to access the secure network. The operations may also include comparing a characteristic of the next attempt to the expected characteristic. Further, the operations may include controlling access to the secure network based on the comparison, wherein a supplicant is not deployed on the device.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

One or more aspects disclosed herein relates to authenticating an endpoint on a secure network without an internal supplicant or a third party supplicant being deployed at the endpoint. An endpoint may be a wired or wireless device such as a laptop, desktop, tablet, switch, router, mobile phone, and so on.

For example, the disclosed aspects remove the burden of integrating 802.1X solutions with the large number of extensible authentication protocol (EAP) methods and supplicants. The supplicants are the programs or software on endpoints that communicate with 802.1X infrastructures. The disclosed aspects remove this burden from infrastructures and allow for the deployment of 802.1X solutions without the challenges of deploying or configuring EAP supplicants.

In another example, the disclosed aspects remove the need to install an internal program or a third party program on an endpoint in order to provide anti-malware solutions. Further, the disclosed aspects provide solutions for other types of software that are used to compromise performance of a device, access data stored on the device, or perform other actions (either malicious or innocuous) with respect to the device. For example, the disclosed aspects replace the need for anti-virus signatures, personal-host-based firewalls, intrusion prevention signatures, application and device controls, incident response solutions, and others.

The disclosed aspects may also be transparent to individuals, organizations, and others that may utilize the aspects disclosed herein. Such transparency is the result of not requiring any software (e.g., supplicant) to be installed on an endpoint (e.g., laptop, desktop, tablet, switch, router, and so on). Further, organizations and others utilizing the disclosed aspects are provided the ability to deploy 802.1X solutions without the need of requiring resources to configure and deploy EAP supplicants, which may reduce time to market. Further, the disclosed aspects may be leveraged to serve the needs that any native or internal supplicants or clients provide (e.g., virtual private network (VPN), network authentication/authorization, anti-virus, malware, and so forth).

Figure 1:
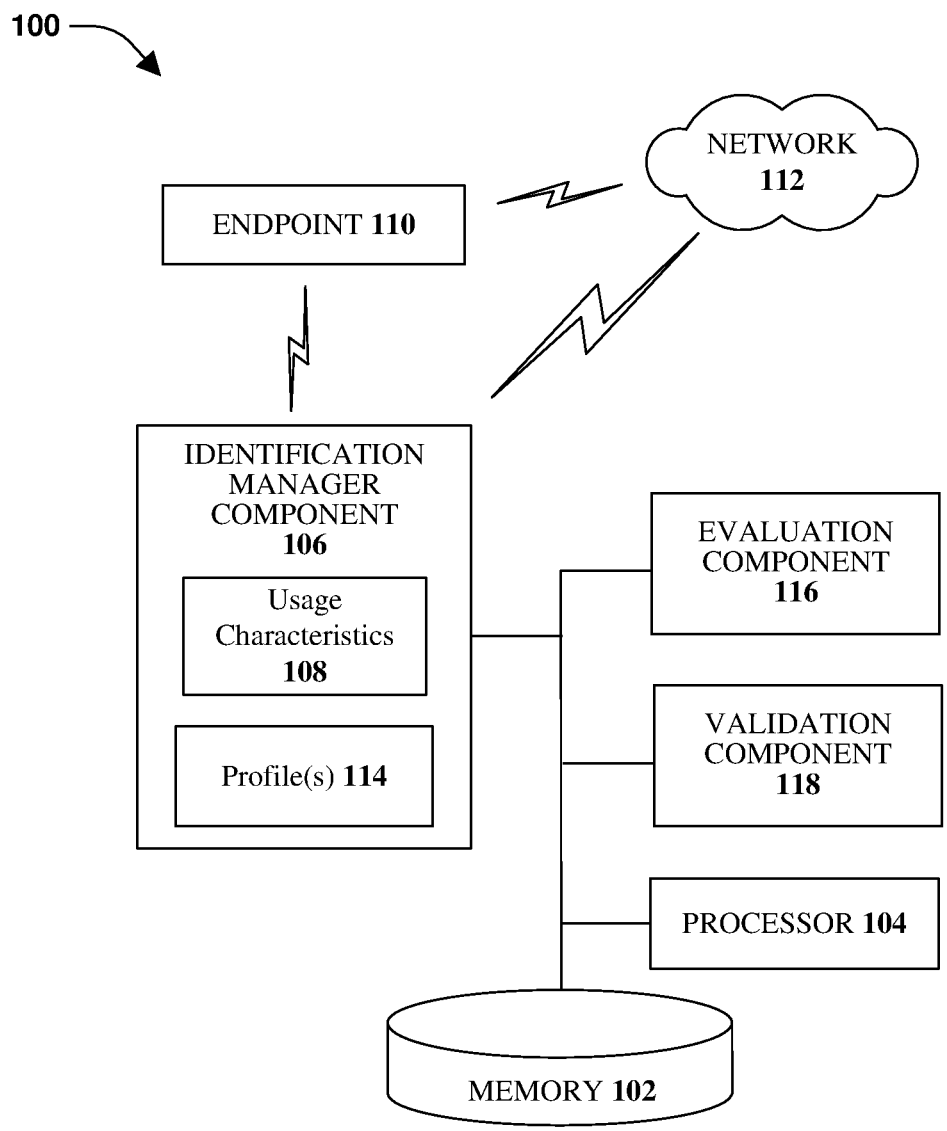
FIG. 1 illustrates an example, non-liming implementation of a system configured for authentication and authorization, according to an aspect.

FIG. 1 illustrates an example, non-liming implementation of a system 100 configured for authentication and authorization, according to an aspect. The system 100 may be configured to implement an authentication and authorization scheme for wired and wireless network infrastructures without the use of a supplicant. Although the following and various implementations may be discussed with respect to 802.1x infrastructures, the disclosed aspects may be utilized as predictive modeling to provide anti-malware or related solutions that traditionally required an internal or third party software application.

The Institute of Electrical and Electronics Engineers (IEEE) has defined 802.1X as an IEEE standard for port based network access control (PNAC), for example. IEEE 802.1X standards may provide an authentication mechanism used by devices to attach to a local area network (LAN), a wireless local area network (WLAN), or other networks. IEEE 802.1X defines the encapsulation of the Extensible Authentication Protocol (EAP) over IEEE 802 (e.g., the family of IEEE standards dealing with local area networks, metropolitan area networks, and other networks).

As an overview, IEEE 802.1X authentication involves at least three components (e.g., software resident on an endpoint), namely, a supplicant, an authenticator, and an authentication server. Supplicant is a term for the software running on a client device (e.g., endpoint) that is attempting to attach to the LAN, WLAN, and so forth. The supplicant software provides credentials to the authenticator, which is a network device, such as a wireless access point and/or an Ethernet switch. The authentication server is a host running software that supports the protocols. The client device is not authorized to access at least a portion of the network until the supplicant's identity has been validated and authorized. In operation, the supplicant provides credentials (e.g., user name/password, digital certificate) to the authenticator. The authenticator forwards the credentials to the authentication server for verification. If verified (e.g., credentials are valid), the supplicant is authorized to access resources located on the network.

In the situation where there is no option available for connecting various devices or endpoints (e.g., computers, mobile devices, systems, and so on) with access to 802.1X wired or wireless network infrastructure, the connection might need to utilize an EAP supplicant. When not using EAP supplicants, in traditional systems 802.1X infrastructures may be limited to less secure means of authentication and/or authorization for network access. The disclosed aspects remove the need for built-in or internal supplicants (e.g., native to the operating system) or third party EAP supplicants.

For example, the disclosed aspects may be agnostic of the operating system or class of the endpoint. Further, the disclosed aspects may leverage data modeling and analysis in order to authenticate and authorize users, endpoints, systems, and so on. Further, the features and functionalities offered by EAP supplicants (e.g., EAP types, VPN, profiling, and so on) may be available in the supplicant-less aspects discussed herein.

In addition, with the increase in the use of mobile devices, it may be beneficial for security purposes to move away from the use of native or third party supplicants, which might not be available on certain devices.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 102 (e.g., operatively connected to the memory 102), the various aspects are not limited to this implementation. Instead, in accordance with various implementations, the one or more computer executable components and/or the one or more computer executable instructions may be stored in (or integrated within) the memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 100 may also include an identification manager component 106 that may be configured to capture usage characteristics 108 associated with an endpoint 110 attempting to access an 802.1X infrastructure, illustrated as an identified network 112. The identified network 112 may be a protected network, for example.

The endpoint 110 may be any type of device that is attempting to connect to an 802.1X infrastructure. Although illustrated and discussed with respect to a single endpoint 110 and a single network 112, the disclosed aspects may be utilized with multiple endpoints attempting to access one or more networks. Further, subsets of the multiple endpoints might be attempting to access a same network, or different networks. In addition, the access attempts may be at substantially the same time, or at different times. In addition, a particular endpoint might attempt to access a first network at a first time and a second network at about the same time or at a different time, where the first network is different from the second network.

The usage characteristics 108 captured by the identification manager component 106 may include usage history, endpoint or device type, login locations (e.g., geographic locations), one or more Internet protocol (IP) address, and other information. A consideration may also be given as to whether the endpoint 110 is a corporate device (associated with the corporate network) or a non-corporate device. Based on an analysis of the usage characteristics 108, the identification manager component 106 may be configured to generate various profiles 114 for the endpoint 110. For example, the profiles 114 may be a user profile associated with a user of the endpoint 110 and/or a device profile associated with the endpoint 110.

An evaluation component 116 may be configured to determine an expected characteristic of a next attempt by the endpoint 110 to access the network 112. The expected characteristic may be based on at least the profiles 114 generated by the identification manager component 106.

A validation component 118 may be configure to automatically authenticate the endpoint 110 for access to the network 112. The authentication and/or prediction of expected characteristics may be performed "on the fly," and may adapt based on dynamically changing circumstances (e.g., what type of authentications are available for the endpoint 110 at this time).

According to some implementations, the validation component 118 may be configured to request re-authentication, such as when there is a state change between the endpoint 110 and the network 112. Further, the validation component 118 may be configured to deny access to the network 112, such as if a current access attempt does not match the expected characteristics and/or if the re-authentication fails. Thus, the access attempt may be selectively allowed, denied, or additional information may be requested to complete the transaction without the need to install a supplicant on the endpoint 110.

Figure 2:
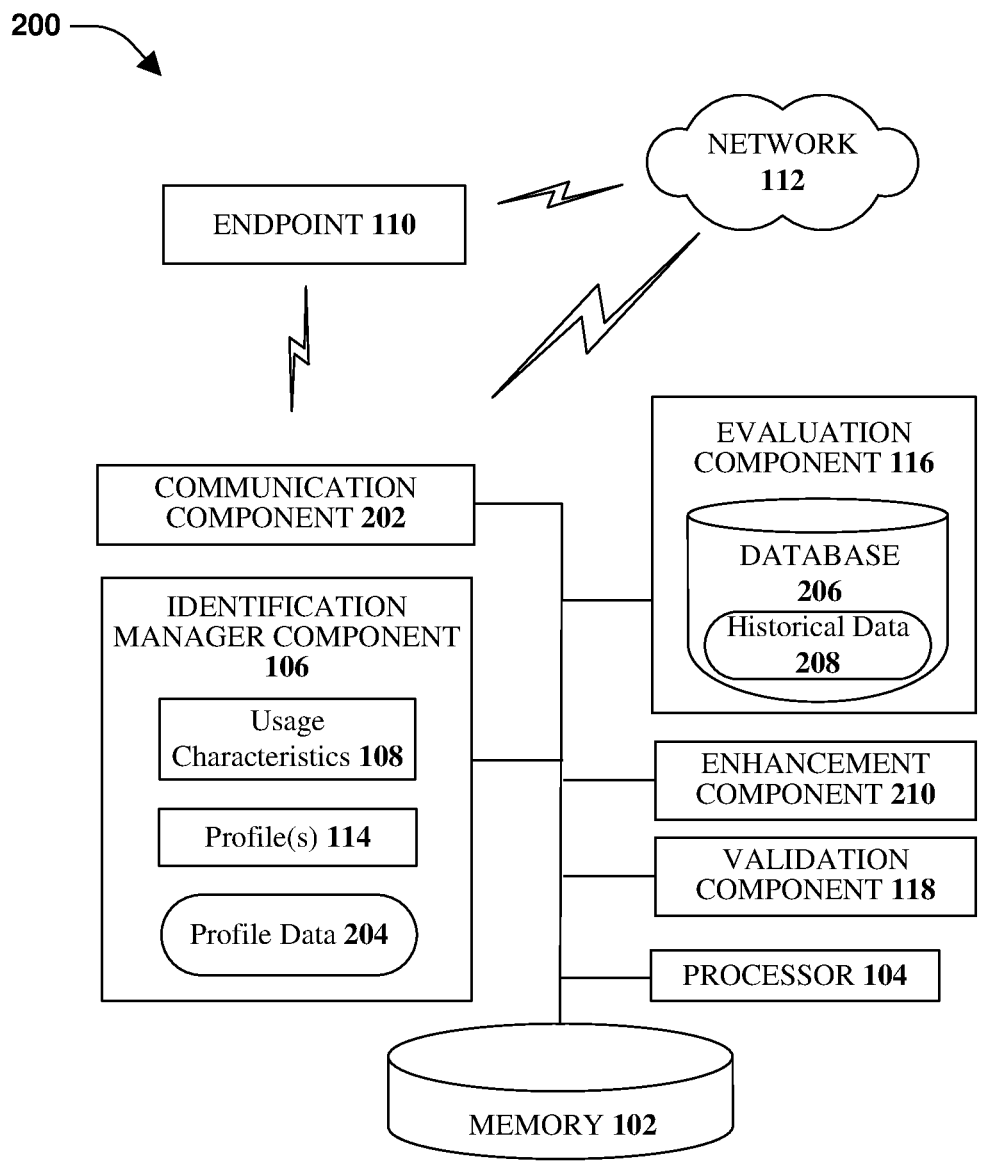
FIG. 2 illustrates an example, non-limiting system configured to selectively allow access to a network without the use of an extensible authentication protocol supplicant, according to an aspect.

FIG. 2 illustrates an example, non-limiting system 200 configured to selectively allow access to a network without the use of an extensible authentication protocol (EAP) supplicant, according to an aspect. The disclosed aspects operate without the need for software to be installed on an endpoint (e.g., device, computer, system, and so on) that is attempting to connect to an 802.1X infrastructure. Further, the disclosed aspects are operating system and endpoint (e.g., device) agnostic.

The system 200 may include a communication component 202 that may be configured to communicate with the endpoint 110. For example, when the endpoint 110 attempts to connect to the network 112, that access attempt may be conveyed through the communication component 202 (or through another system 200 component). If the attempt is an initial attempt for that network 112, the communication component 202 may send a request to the endpoint 110 for authentication information. The request may be for a unique user name/password pair that may be input by an entity associated with the endpoint 110. However, other manners of authenticating the endpoint 110 may be utilized in accordance with various implementations. As utilized herein a user, client, entity, or the like, may refer to a human, an actor, a computer, the Internet, a system (or another system), a commercial enterprise, a computer, a machine, machinery, and so forth, hereinafter referred to as a user, a client, and/or an entity, depending on the context.

Based on a determination that the access attempt is successful, data regarding the endpoint 110 may be transmitted from the communication component 202 to the identification manager component 106. The data transmitted may be data that may be utilized to authenticate the endpoint 110 during a future access attempt, without the need to deploy a supplicant on the endpoint 110. For example, the data transmitted by the communication component 202 may include the usage characteristics 108 and/or the profiles 114. The usage characteristics 108 may include use history, networks previously accessed, previous access attempts, and so on. The profile 114 may include data including, but not limited to, device type, login locations, IP addresses, and so on.

Based, at least in part, on the usage characteristics 108 and/or the profiles 114, the identification manager component 106 may be configured to generate profile data 204 for the endpoint 110. According to an implementation, the profile data 204 is generated based on the endpoint 110 being authenticated and authorized to access the network 112. Further, if the access attempt is not successful, profile data may also be generated. Therefore, profile data is generated in both successful and failed authentications and/or authorizations.

The evaluation component 116 may be configured to determine an expected characteristic of a next attempt by the endpoint 110 to access the network 112 (or a different network). To determine the expected characteristic, the evaluation component 116 may access a database 206 that retains historical data 208. According to an implementation, the historical data 208 may include profile data generated during the one or more previous access attempts. According to some implementations, the historical data 208 may include information regarding use history associated with the endpoint 110. In further implementations, the historical data 208 may include previous login locations or geographic coordinates and/or IP addresses. Other historical data 208 may include data indicative of an operations system at the endpoint 110. Further, the historical data 208 may include, but is not limited to, a hardware class associated with the endpoint 110, and/or a path behavior of the endpoint 110 or of other endpoints that are a same type as the endpoint 110 (e.g., is it a laptop?, is it a tablet?, and so on).

As illustrated, the database 206 may be included, at least partially, in the evaluation component 116. However, according to other implementations, the database 206 may be retained in the memory 102 or in another system 200 component. According to some implementations, the database 206 may be retained external to the system 200, wherein the system 200 accesses the external source as needed.

Through utilization of the profile data 204 and the historical data 208 (e.g., other profile data), the evaluation component 106 may be configured to predict a port connection for the next attempt to access the network 112 (or another network). A port is an application-specific or process-specific software construct that may operate as an endpoint. The purpose of an endpoint is to uniquely identify different applications or processes running on a device and enable the devices to share a single physical connection to a network. According to some implementations, a port may be associated with an IP address of the host and the type of protocol used for communication.

For example, the evaluation component 116 may be configured to understand details associated with the endpoint 110, including a path the endpoint 110 uses to connect with the network 112. The next time the endpoint 110 attempts to authenticate (e.g., one minute later, two minutes later, a day later, a week later, and so on), the evaluation component 116 may profile the endpoint 110. Based on this profile, an enhancement component 210 may be configured to determine if there is a more effective manner of authenticating the endpoint 110. For example, based on the profile, the enhancement component 210 may indicate that a certificate would be a better way of authenticating the endpoint 110. Thus, the enhancement component 210, in combination with the evaluation component 116, may make the decision as to how to authenticate the endpoint 110.

Continuing the above example, if the certificate is utilized to authenticate, the system 200 may no longer need to receive a password. According to an implementation, the evaluation component 116 may take the user name/password pair and hash the pair with the certificate and associate that hashed information with the endpoint 110. Each time the endpoint 110 attempts to authenticate, the more efficient manner of authentication might be utilized, which may the same as a previous authentication attempt or different from previous authentication attempts. Due to the dynamic nature of the manner of authentication, the same authentication scheme might not always be utilized by the system 200. Instead, the better way to authenticate and authorize the endpoint 110 might be determined based on the available information and what is known about the end user and/or the end user device.

The validation component 118 may be configured to compare a characteristic of a next attempt to the connect to the network 112 to the expected characteristic(s) determined by the evaluation component 116. If the characteristic does not match the expected characteristic, the validation component 118 may solicit additional information or may automatically deny the access attempt based on defined rules or policies associated with the endpoint 110 and/or the network 112. For example, if there is not a match, the authentication component 118 may request additional information from the endpoint 110. According to an implementation, the additional information might be a re-authentication to a port (e.g., similar to an initial authentication).

In accordance with an aspect, the validation component 118 may request an authentication of the endpoint 110 based on a state change between the endpoint 110 and the network 112. For example, the state change may include any state change that would trigger 802.1X authentication and authorization.

If the determination by the validation component 118 is that the characteristic of the next attempt to connect to the network 112 matches the expected characteristic, the validation component 118 automatically authenticates the endpoint 110. Such validation may occur without the need to deploy an internal supplicant and/or a third party supplicant on the endpoint 110.

The various aspects discussed herein may generate layer-2 (e.g., open systems interconnection (OSI) Model—Data Link Layer) 802.1X EAP responses and requests in place of internal or third party EAP supplicants. Instead of requiring a supplicant to be installed on an endpoint (e.g., laptop, tablet, desktop, and so on), the disclosed aspects may respond to any state changes that would normally trigger 802.1X authentication and authorization. The system may be aware of all existing EAP methods (e.g., EAP-TLS (EAP-transport layer security), PEAP (Protected Extensible Authentication Protocol), EAP, Chaining, and so on) and may be able to learn about newly released and supported EAP methods. This may occur based on system updates that occur automatically, at defined intervals, and so on.

Further, the various aspects discussed herein may support user and machine authentication, or any other supported EAP methods. When an 802.1X event occurs, the disclosed aspects may determine the type of 802.1X method to leverage (e.g., user or machine), and may utilize the appropriate EAP method. Further, the disclosed aspects may leverage data analysis and modeling from historical 802.1X authentications and endpoint types (e.g., tablets, laptops, desktops, switches, routers, and so forth). The various aspects may also be device and operating system agnostic and may be able to learn and adapt to new classes of endpoints and EAP methods.

Figure 3:
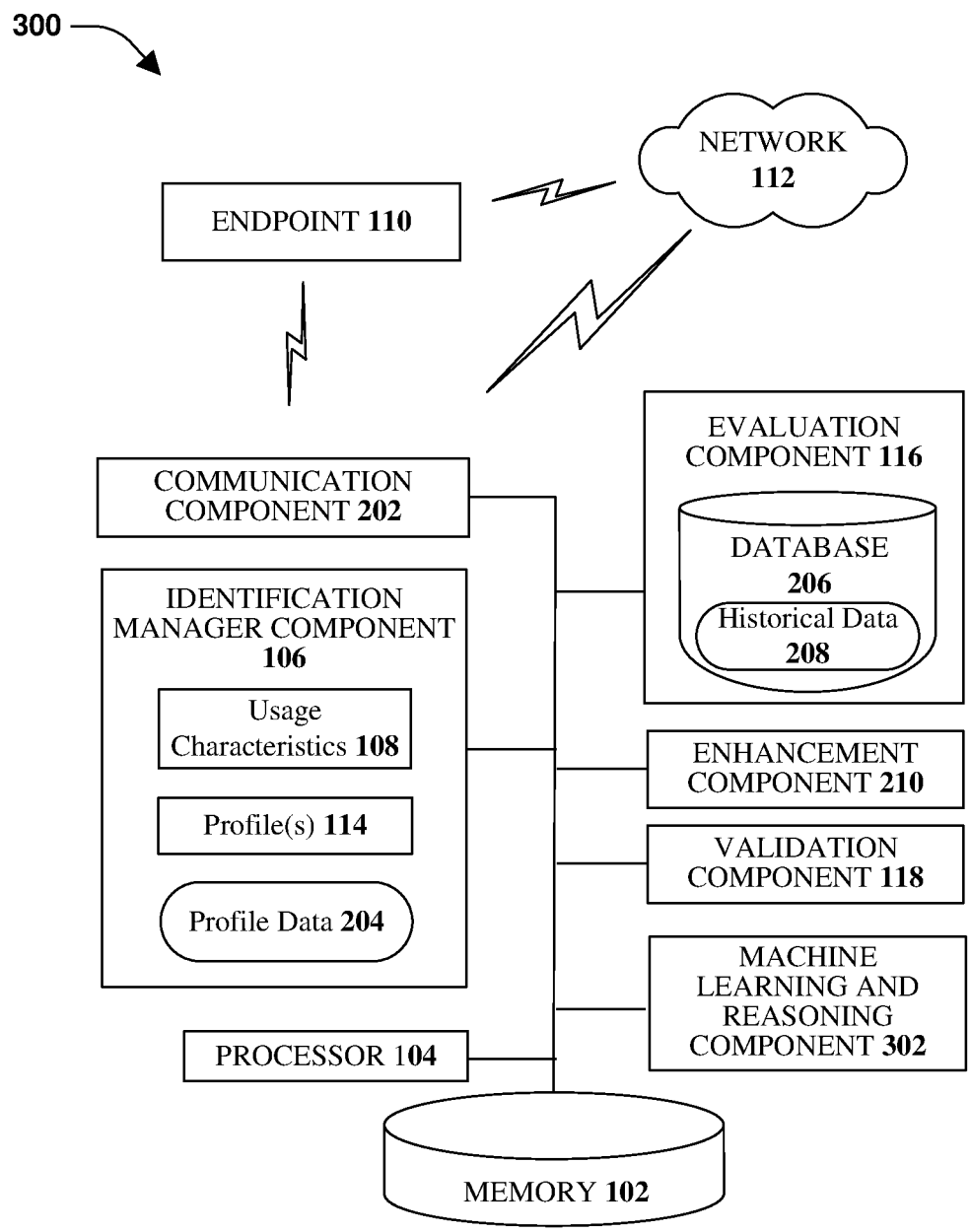
FIG. 3 illustrates an example, non-limiting system configured for dynamic authentication and authorization, according to an aspect.

FIG. 3 illustrates an example, non-limiting system 300 configured for dynamic authentication and authorization, according to an aspect. Automated learning may be employed to facilitate one or more of the disclosed aspects. For example, a machine learning and reasoning component 302 may be utilized to automate one or more of the disclosed aspects. The machine learning and reasoning component 302 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 302 may employ principles of probabilistic and decision theoretic inference. Additionally or alternatively, the machine learning and reasoning component 302 may rely on predictive models constructed using machine learning and/or automated learning procedures. Logic-centric inference may also be employed separately or in conjunction with probabilistic methods.

The machine learning and reasoning component 302 may infer an expected characteristic of a next access attempt by obtaining knowledge about previous access attempts, use profiles, device profiles, and so on. Based on this knowledge, the machine learning and reasoning component may make an inference based on which authentication parameter might be better suited for a particular access attempt. For example, a determination may be made related to whether it would be more beneficial to use a certificate, a user name/password pair, or another type of authentication for a current access attempt.

As used herein, the term "inference" refers generally to the process of reasoning about or inferring states of the system, a component, a module, the environment, endpoints, and/or mobile devices from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 302 has uncertainty related to an access attempt and/or authentication of a particular device (e.g., endpoint), the machine learning and reasoning component 302 may automatically engage in a short (or long) dialogue or interaction with the user of the device (e.g., "What is your answer to this security question?"). In accordance with some aspects, the machine learning and reasoning component 302 engages in the dialogue with the user through another system 300 component. Computations of the value of information may be employed to drive the asking of questions. For example, if there is a security concern related to the user currently operating the device, more detailed questions may be solicited from the user.

The various aspects (e.g., in connection with authenticating a device and authorizing access) may employ various artificial intelligence-based schemes for carrying out various aspects thereof. For example, a process for determining if a particular action is more likely than not to be used on a next access attempt may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine characteristics of a next access attempt or when to require re-authentication, which may be based on a state change. In the case of authentication, for example, attributes may be identification of a user profile and/or a device profile and the classes are criteria of the user profile and/or a device profile that need to be utilized to satisfy the request.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing historical information, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to automatically authenticate a device, when to solicit additional information, when the deny authentication of a device, and so forth. The criteria may include, but is not limited to, similar access attempts, historical information, and so forth.

Additionally or alternatively, an implementation scheme (e.g., a rule, a policy, and so on) may be applied to control and/or regulate authentication and/or authorization of one or more user devices. In some implementations, based upon a predefined criterion, the rules-based implementation may automatically and/or dynamically process authentication requests. In response thereto, the rule-based implementation may automatically interpret and carry out functions associated with the authentication by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
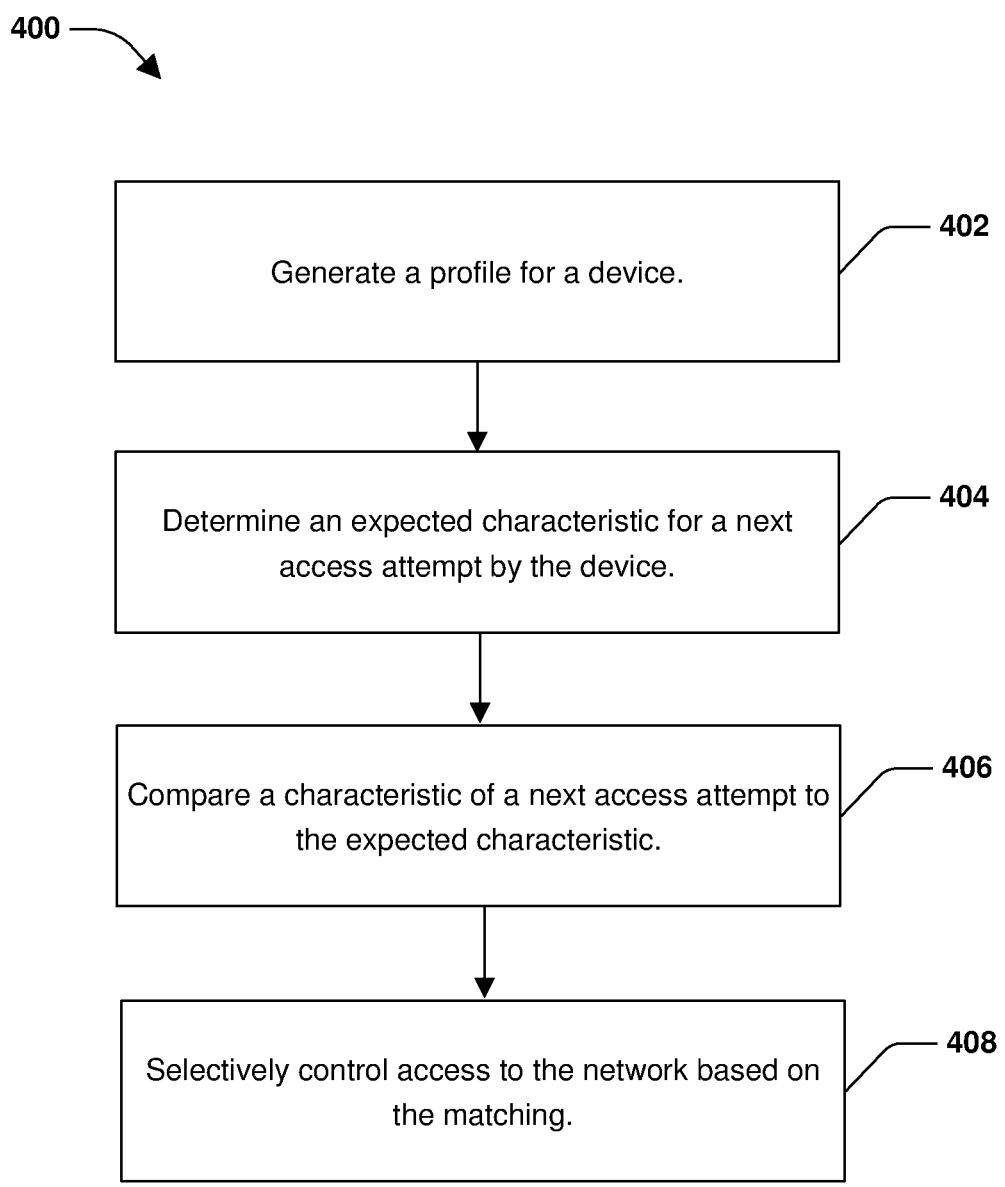
FIG. 4 illustrates an example, non-limiting method for authentication and authorization without deployment of a supplicant, according to an aspect.

FIG. 4 illustrates an example, non-limiting method 400 for authentication and authorization without deployment of supplicants, according to an aspect. The method 400 in FIG. 4 may be implemented using, for example, any of the systems, such as the system 100 (of FIG. 1).

At 402, at least one profile for a device may be generated. The profile may be generated based on one or more characteristics observed during a successful attempt by the device to access a network. For example, if a device attempts to access the network and the device is not authenticated (and access is not authorized), the information related to that access attempt is disregarded. If however, the device is authenticated (and access is authorized), the information related to the access attempt may be analyzed to generate the profile. Further, the information related to the access attempt may be retained as historical information associated with the device.

Based at least in part on the profile, at 404, an expected characteristic for a next attempt by the device to access the network is determined. In some implementations, more than one expected characteristic may be determined. The expected characteristics may be a prediction of the characteristic(s) of a next attempt to log in from the device to a port in the 802.1X network. Further, the expected characteristics may be determined based, at least in part, on user profiles and/or device profiles.

At 406, a characteristic of a next access attempt is compared to the expected characteristic and access to the network is selectively controlled, at 408, based on the results of the comparison. For example, if the comparison indicates there is a match, the device may be automatically authorized. However, if the comparison indicates that there is not a match, access may be denied or further information may be solicited from the device (or user of the device). If further information is solicited, responses may be analyzed and compared to expected responses to determine if the device is authorized and, if so, the device may be authenticated with the network.

Figure 5:
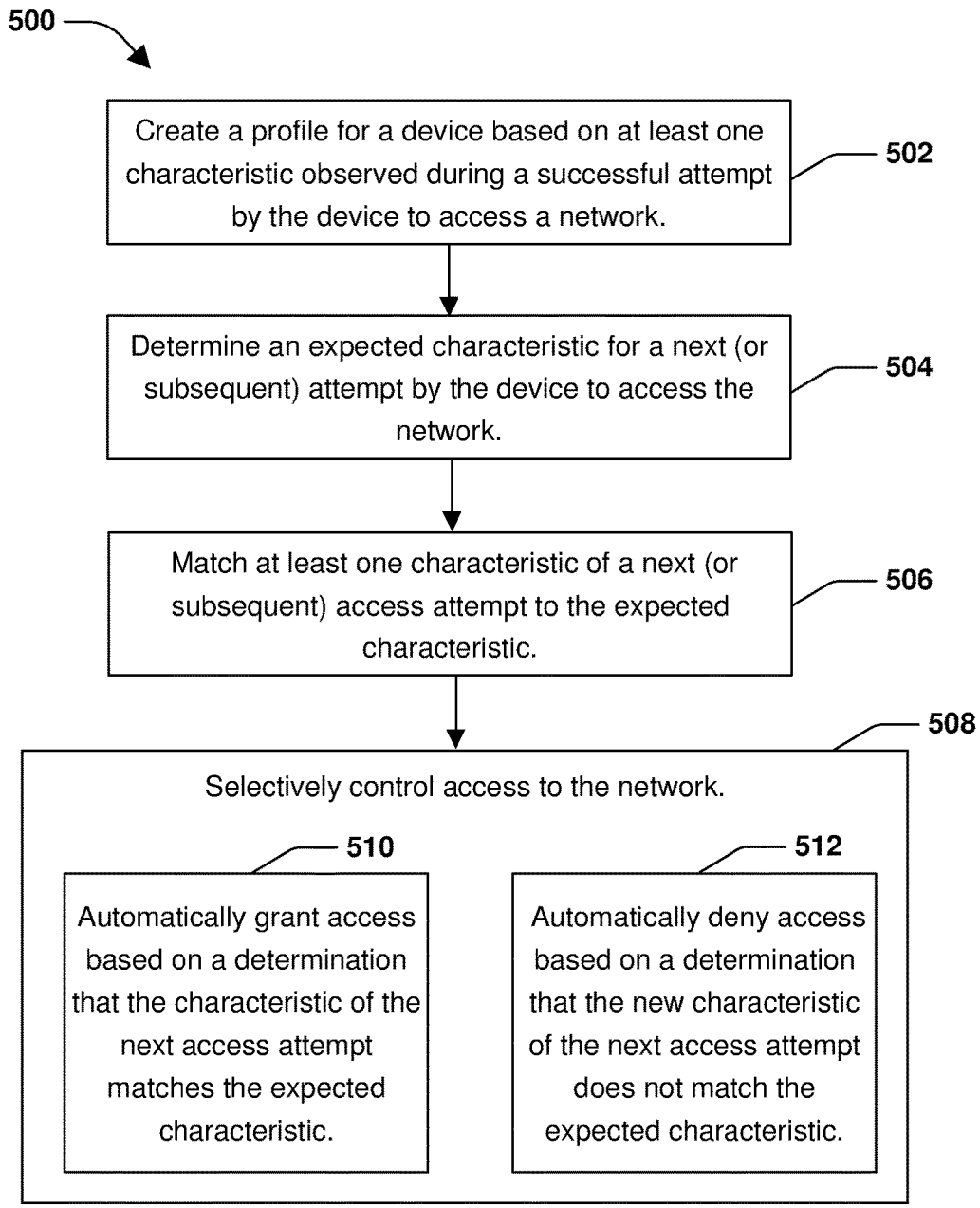
FIG. 5 illustrates another example, non-limiting method for device authentication and authorization, according to an aspect.

FIG. 5 illustrates another example, non-limiting method 500 for device authentication, according to an aspect. The method 500 in FIG. 5 may be implemented using, for example, any of the systems, such as the system 200 (of FIG. 2). The various aspects disclosed herein, including the method 500, remove the requirement of configuring and deploying 802.1X EAP supplicants, which may be a hindrance for the deployment of 802.1X solutions.

The method 500 starts, at 502, when a profile for a device is created based on at least one characteristic observed during a successful attempt by the device to access a network. The profile for the device is created without the need to install a supplicant on the device.

Based, at least in part on the profile, an expected characteristic for a next (or subsequent) attempt by the device to access the network is determined, at 504. The expected characteristic may be a prediction of characteristics associated with the next (or subsequent) access attempt. The observed characteristics and the expected characteristic may be the same characteristic. However, according to some implementations, the observed characteristic and the expected characteristic may be different characteristics.

At 506, at least one characteristic of a next (or subsequent) access attempt is matched to the expected characteristic. The matching may include determining whether the characteristic is the same, or similar, to the expected characteristic.

Based on the result of the matching, at 508, access to the network is selectively controlled. According to an implementation, selectively controlling the access includes, at 510, automatically granting access based on a determination that the characteristic of the next access attempt matches the expected characteristic. Such automatic authorization may be performed without the requirement of installing a supplicant on the client device.

In an alternative implementation, selectively controlling the access includes, at 512, automatically denying access based on a determination that the new characteristic of the next access attempt does not match the expected characteristic. In some implementations, further information is solicited from the client device (or the client) to obtain information that may be utilized to authenticate the device in the situation where the expected characteristic did not match the characteristic of the next access attempt, but it is the same device.

In accordance with some aspects, the method 500 may include generating layer-2 802.1X extensible authentication protocol responses and requests in place of extensible authentication protocol supplicants. The extensible authentication protocol supplicants may be internal supplicants or third party supplicants.

Figure 6:
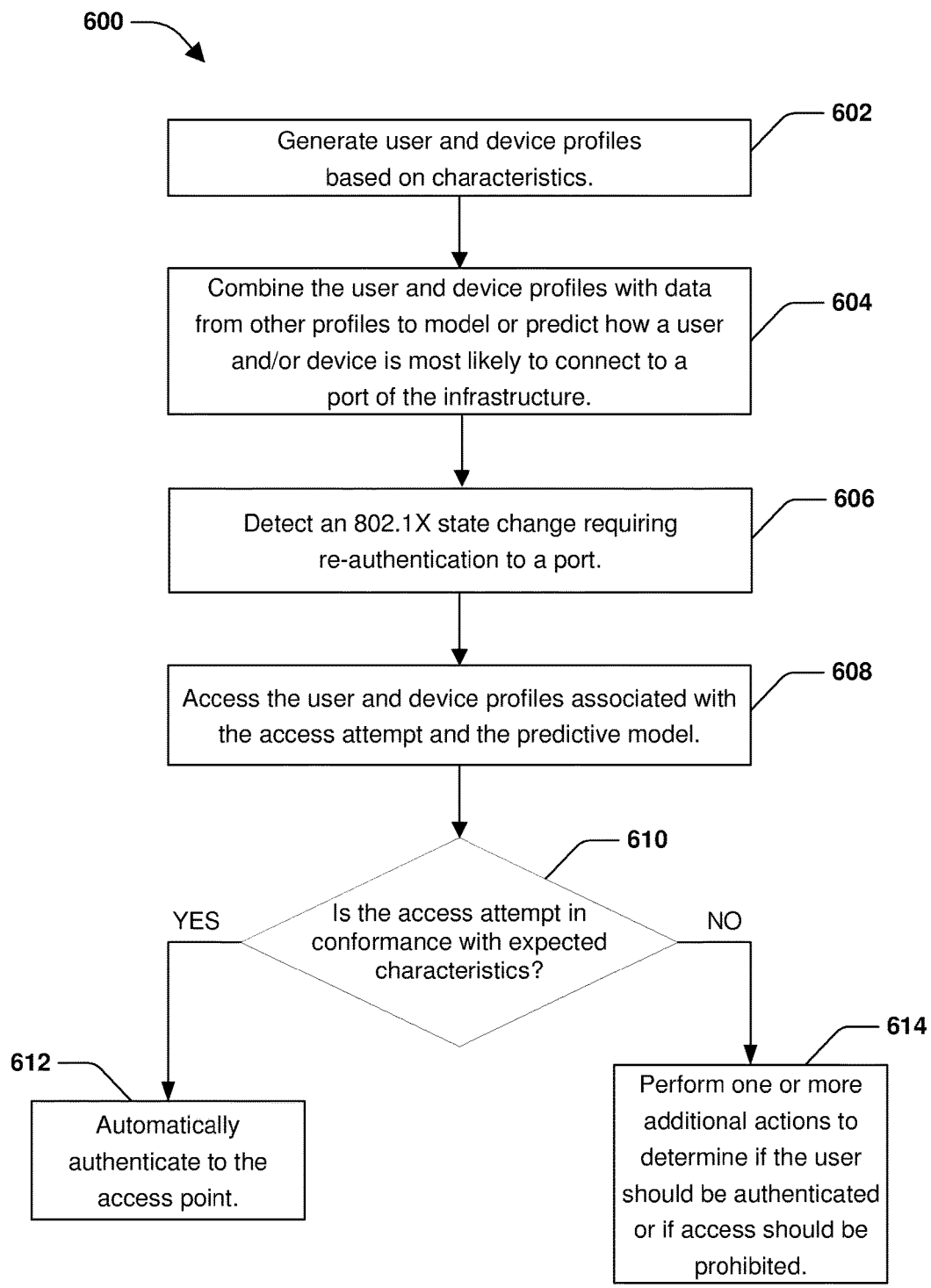
FIG. 6 illustrates another example, non-limiting method for authenticating devices without the use of supplicants, according to an aspect.

FIG. 6 illustrates another example, non-limiting method 600 for authenticating devices without the use of supplicants, according to an aspect. The method 600 in FIG. 6 may be implemented using, for example, any of the systems, such as the system 100 (of FIG. 1). At 602, user and device profiles are generated based on characteristics, such as use history, device type, login locations, IP addresses, and so on. The device may be a laptop, desktop, mobile device, or another computer system that connects to an 802.1X infrastructure.

At 604, the user and device profiles are combined with data from other profiles to model or predict how a user and/or device is most likely to connect to a port of the infrastructure. At 606, an 802.1X state change requiring re-authentication to a port is detected. The state change may be a new connection to an access point, disconnection of an Ethernet cable, and so on.

Based on the state change, at 608, the user and device profiles associated with the access attempt and the predictive model are accessed and, at 610, a determination is made whether the access attempt is in conformance with expected characteristics. If the characteristics agree with the predictive model ("YES"), the user is automatically authenticated to the access point, at 612.

If the characteristics do not agree with the predictive model ("NO"), one or more additional actions may be taken, at 614, to determine if the user should be authenticated or if access should be prohibited. The additional actions may include soliciting more information from the user through the user device, soliciting more information directly from the user device, reviewing previous certificates associated with the user device, and so on.

Figure 7:
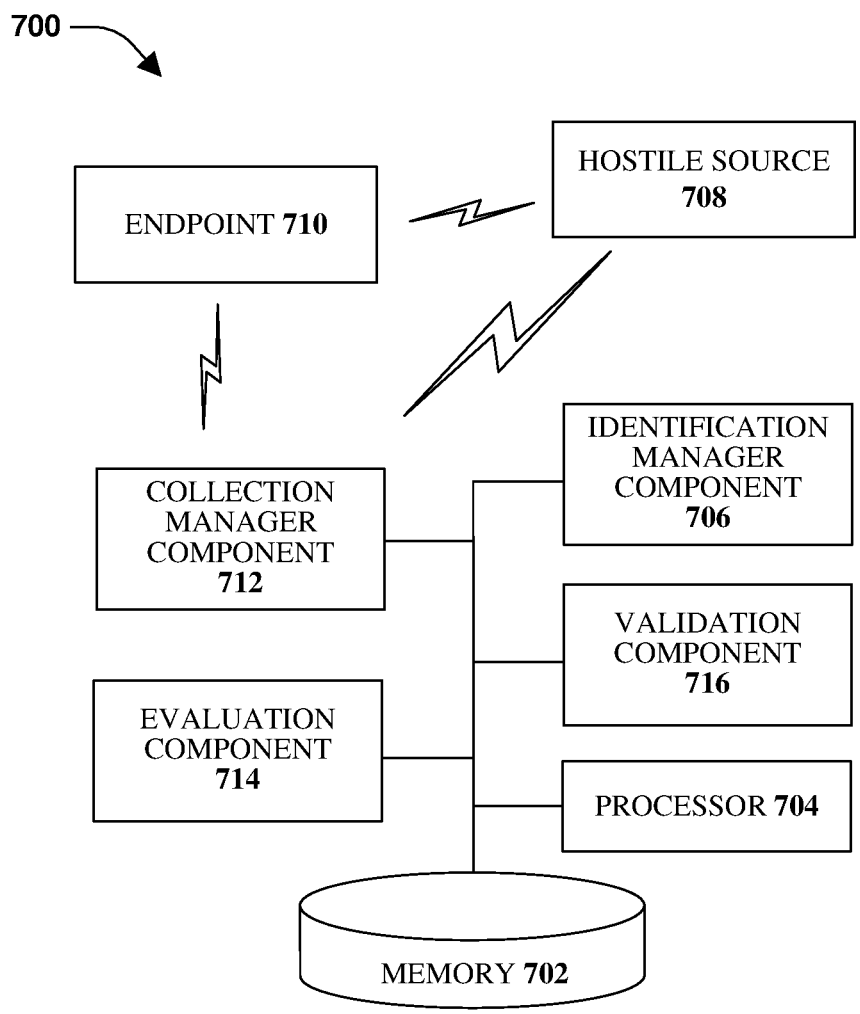
FIG. 7 illustrates an example, non-limiting system configured for utilization of predictive modeling for anti-malware solutions, according to an aspect.

FIG. 7 illustrates an example, non-limiting system 700 configured for utilization of predictive modeling for anti-malware solutions, according to an aspect. The system 700 may provide anti-malware solutions without the need to deploy an internal or third party software application on an endpoint. Based on collected data related to hostile events, a data profile may be created dynamically for hostile networks. The profile data may be used to determine whether or not a device can connect to a network or whether the network poses a risk to the device. Existing approaches that identify potential sources of malware require internal or third party software to be installed on the user device. Further, the collection of data related to the potential sources of malware in existing approaches is cumbersome and is not applied dynamically.

The system 700 may include at least one memory 702 and at least one processor, communicatively coupled to the at least one memory 702. Also included may be an identification manager component 706 that may be configured to generate profile data related to a potential hostile source 708. For example, the potential hostile source 708 may be one or more networks, one or more rogue devices, profiles sites that include the rouge device(s), listening technology installed on an endpoint 710, and so on.

The identification manager component 706 may receive various data related to the potential hostile source 708 and/or the endpoint 710 from a collection manager component 712. For example, the collection manager component 712 may be configured to obtain various data from the endpoint 710 including, but not limited to, network traffic data, geographic location data, and so forth. Additionally or alternatively, the collection manager component 712 may be configured to obtain various data related to the potential hostile source 708 including, but not limited to, address resolution protocol data, which is used to map an Internet protocol address to a physical machine address that is recognized in the network.

The profile data generated by the identification manager component 706 may be utilized by an evaluation component 714 that may be configured to recognize the potential hostile source 708. For example, the profile data may be utilized to determine the existence of the potential hostile source 708 on the endpoint 710 or in communication with the endpoint 710. For example, the potential hostile source 708 may be included on the endpoint 710 in the form of listening technology deployed on the endpoint 710.

For example, the evaluation component 714 may be configured to determine characteristics associated with the potential hostile source 708 and create, for example, a database that contains the determined characteristics. At a next attempt by the endpoint 710 to access the potential hostile source 708 (or to have another type of interaction with the potential hostile source 708), a validation component 716 may be configured to compare a characteristic of the next attempt to the determined characteristics. If the characteristics match, the validation component 716 may be configured to control access to (or from) the potential hostile source 708. For example, if the characteristics of a next attempt do not match the determined characteristics, the interaction may be allowed to proceed. However, if the characteristics of the next attempt match the determined characteristics, the interaction may be blocked.

Figure 8:
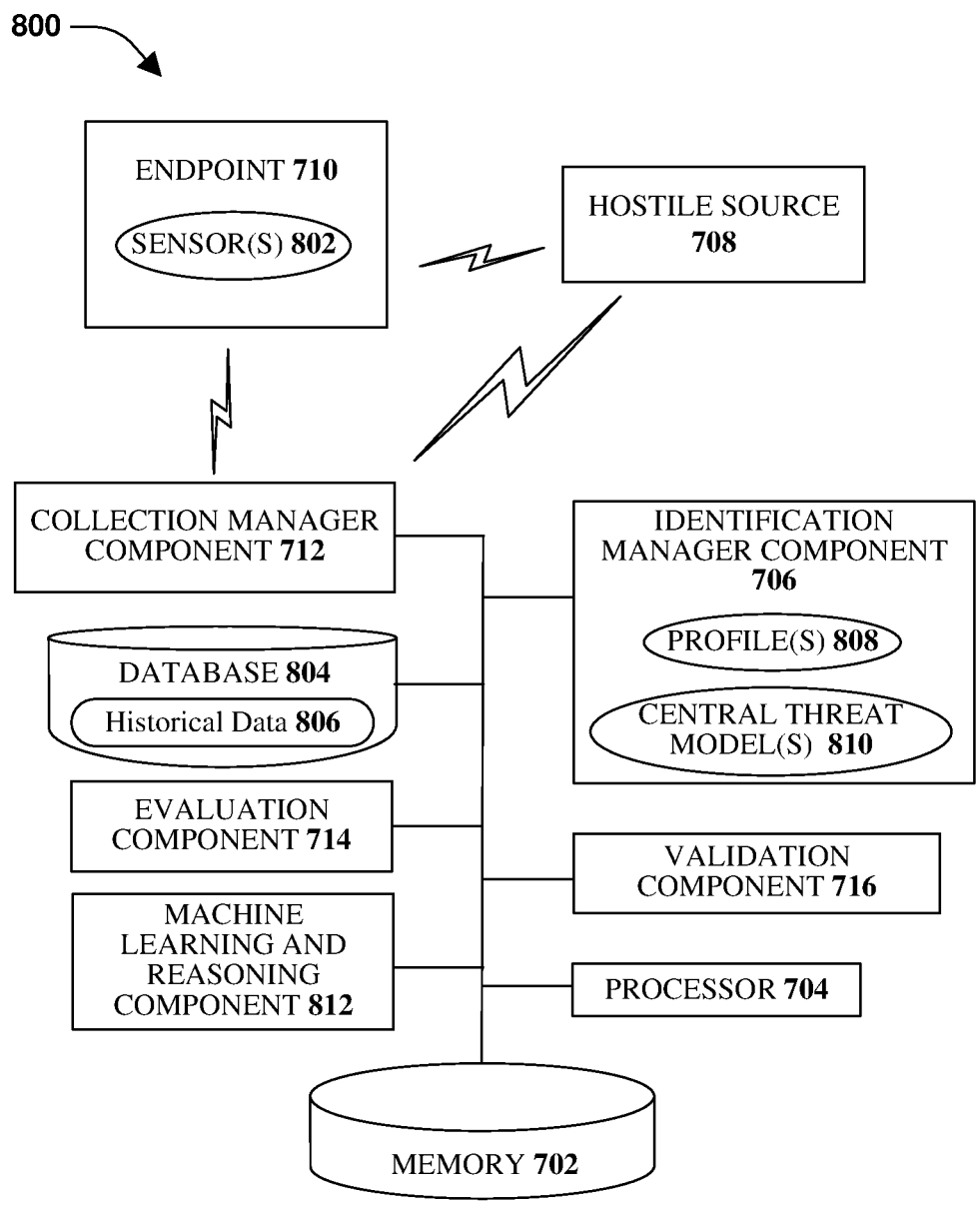
FIG. 8 illustrates another example, non-limiting system configured for predictive modeling to provide anti-malware solutions, according to an aspect.

FIG. 8 illustrates another example, non-limiting system 800 configured for predictive modeling to provide anti-malware solutions, according to an aspect. The predictive modeling may allow for various technology (such as malware) to be detected before being installed on an endpoint 710 or before the endpoint 710 is subject to attack from a hostile source 708.

According to an implementation, one or more sensors 802 on the endpoint 710 may be utilized to facilitate the predictive modeling. The one or more sensors 802 can be any type of sensors that are configured to collect various data that may indicate a hostile source 708. For example, the one or more sensors 802 may collect network traffic data, geographic location data, host network data, and so on. Further, respective sensors of the one or more sensors 802 may collect different data. For example, one sensor may collect traffic data, a second sensor may collect geographic location data, a third sensor may collect host network data, and so on. According to an implementation, the host network data may be associated with a central repository. The data collected by the one or more sensors 802 may be stored in a database 804 (similar to the database 206 of FIG. 2) as historical data 806.

The identification manager component 706 may correlate the collected data and use the data to create profiles 808 for the hostile source 708 (e.g., a hostile network). For example, by collecting the available network data, vulnerability data from the endpoint 710 is provided and can be analyzed to determine if the source of the data is harmless, or instead is the hostile source 708.

In an implementation, when the endpoint 710 connects to another endpoint, the endpoint 710 can use protocol inspection by capturing network traffic samples. In some implementations, available session data may be mined for Internet forensic information. The data may be utilized to create a profile 808. According to some implementations, a central threat model(s) 810 may be created based on the profile 808. The profile(s) 808 and the central threat model(s) 810 may be utilized across endpoints such that when an endpoint attempts to access a network (or other source), attributes of the network may be compared to the profile(s) 808 and/or central threat model(s) 810 to determine if the network is a potential hostile source.

According to some implementations, port scanning and/or enumeration data may be collected (e.g., by the one or more sensors 802 or by another system 800 component). The port scanning and/or enumeration data may be correlated with geographic Internet protocol location information. Thus, in cases where a hostile source 708 is associated with a particular location, the profile data created by the identification manager component 706 can include the location data. Thus, when another endpoint is within the vicinity, profile data specific to the location can be analyzed in addition to more global profile data being analyzed. The location specific hostile source may be related to a particular device associated with a virtual private network, a local area network, a metropolitan area network, or other types of localized networks and/or endpoints connected through such networks.

In an additional or alternative implementation, address resolution protocol information may be collected from local segments. The address resolution protocol information is utilized to map an Internet protocol address to a physical machine that is recognized in the network. The address resolution protocol information may be utilized to profile sites that may have rogue devices (e.g., rogue endpoints) or listening technology planted.

The system 800 may also include a machine learning and reasoning component 812 (similar to the machine learning and reasoning component 302 of FIG. 3). The machine learning and reasoning component 812 may infer a characteristic of a hostile source by obtaining knowledge about previous access attempts, network traffic data, geographic location data, host network data, and so on. Further, the machine learning and reasoning component 812 may infer a characteristic of the hostile source through protocol inspected based on captured network traffic samples, port scanning and enumeration data, and/or address resolution protocol data.

According to some implementations, the various aspects discussed herein may be combined. For example, the system 100 of FIG. 1, the system 200 of FIG. 2, and/or the system 300 of FIG. 3 may be combined with the system 700 of FIG. 7 and/or the system 800 of FIG. 8. In such a manner, characteristics of a next attempt and characteristics of a potential hostile source may be utilized to determine whether one or more access attempts should be allowed, if applications should be installed on an endpoint, or if other actions should be taken.

Figure 9:
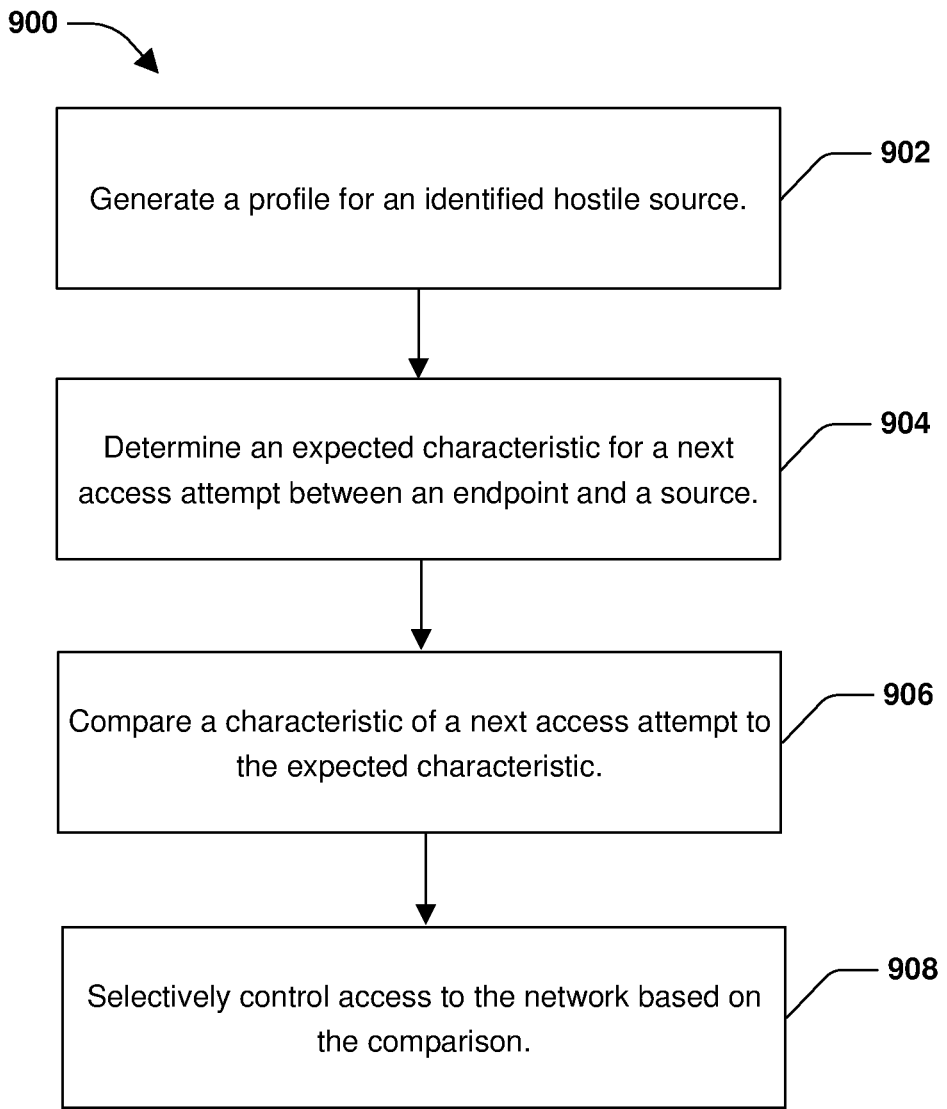
FIG. 9 illustrates an example, non-limiting method for using predictive modeling to provide anti-malware solutions, according to an aspect.

FIG. 9 illustrates an example, non-limiting method 900 for using predictive modeling to provide anti-malware solutions, according to an aspect. The method 900 uses predictive modeling for anti-malware solutions without the need to install internal or third party software applications on a user device. Based on collected data related to hostile events, a data profile is created dynamically for hostile networks. The profile data is used to determine whether or not a device can connect to a network or whether the network poses a risk to the device. Existing approaches that identify potential sources of malware require internal or third party software to be installed on the user device. Further, the collection of data related to the potential sources of malware in existing approaches is cumbersome and is not applied dynamically.

Method 900 starts at 902 when a profile for an identified hostile source is generated. The hostile source may be identified based on a previous known attack on an endpoint or on a network. For example, a rogue attack may have been previously directed toward the endpoint. Various parameters associated with the rogue attack may be used to generate the profile. In another example, address resolution protocol information from local segments may be utilized to generate the profile. In another example, geographic Internet protocol information, network traffic information, host network information, or other types of information may be utilized to generate the profile.

At 904, an expected characteristic of a next access attempt between an endpoint and a source is determined. The source may be the identified hostile source or the source may be a different source (either hostile or non-hostile). The expected characteristic may be a characteristic associated with the generated profile.

A characteristic of the next access attempt is compared with the expected characteristics, at 906. For example, the expected characteristic may be an Internet protocol address associated with a communication received from the source. The Internet protocol address for the current communication is compared to an Internet protocol address (e.g., expected characteristic) of one or more hostile sources.

At 908, the next access attempt may be selectively controlled based on the comparison. Continuing the above example, if the Internet protocol (e.g., characteristic of the next access attempt) matches the Internet protocol address (e.g., expected characteristic), the next access attempt is denied. However, if the Internet protocol addresses do not match, the next access attempt is allowed.

Figure 10:
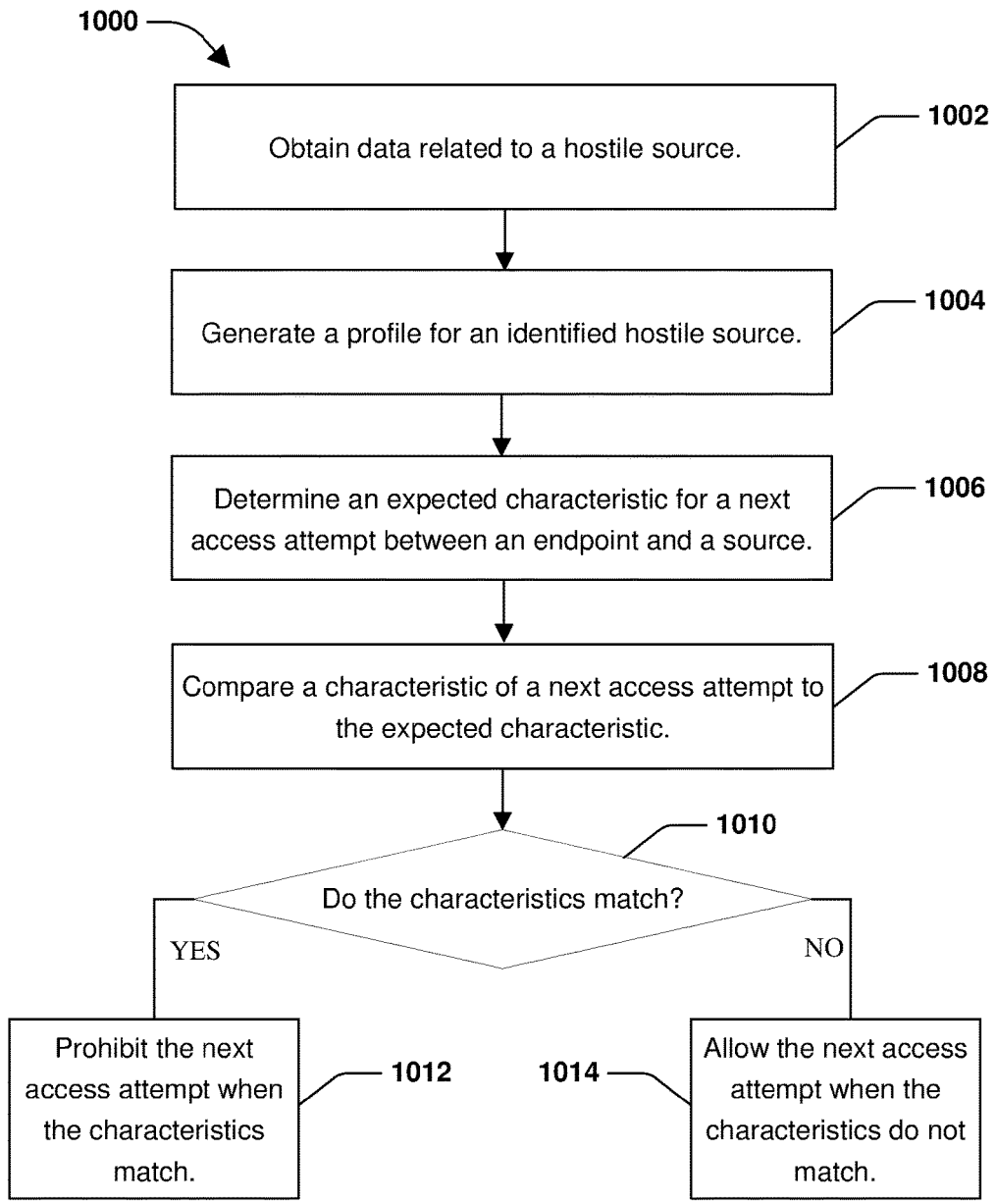
FIG. 10 illustrates another example, non-limiting method for using predictive modeling to provide anti-malware solutions, according to an aspect.

FIG. 10 illustrates another example, non-limiting method 1000 for using predictive modeling to provide anti-malware solutions, according to an aspect. The predictive modeling may be utilized to evaluate a behavior, determine if the behavior occurring is trusted or is not trusted, and proceed to allow (or deny) an interaction between an endpoint and a source.

At 1002, data related to a hostile source is obtained. The data may include network traffic data, geographic location data, host network data, traffic sample data, port scanning and enumeration data, address resolution protocol data, and other data. Based on the obtained data, at 1004, a profile for an identified hostile source is generated based on data associated with the identified hostile source. The hostile source may be identified based on behavior that is not trusted, which may be determined based on historical information related to the same or similar behavior. According to an implementation, the profile may be generated based on obtaining data related to a recent rogue attack directed toward the endpoint or another endpoint.

An expected characteristic of a next access attempt between an endpoint and a source may be generated at 1006. The expected characteristic may be a characteristic that indicates the source is a hostile source. At 1008, a characteristic of a next access attempt is compared with the expected characteristic.

A determination is made, at 1010, whether the expected characteristic matches the characteristic of the next access attempt. If the characteristics match ("YES"), at 1012, the next access attempt is prohibited. If the characteristics do not match ("NO"), at 1014, the next access attempt is allowed.

Figure 11:
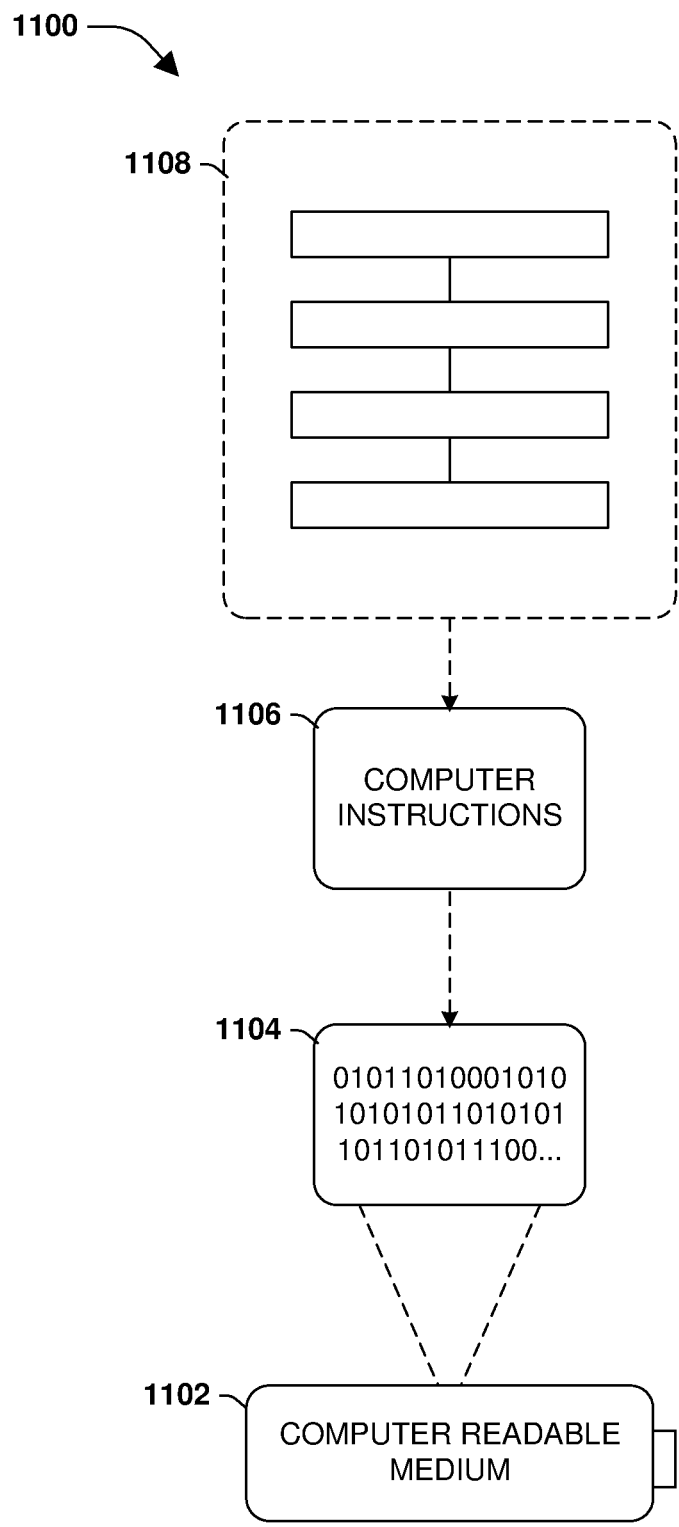
FIG. 11 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 11, wherein an implementation 1100 includes a computer-readable medium 1102, such as a CD-R, DVD-R, flash drive, a platter of a hard disk drive, and so forth, on which is encoded computer-readable data 1104. The computer-readable data 1104, such as binary data including a plurality of zeros and ones as illustrated, in turn includes a set of computer instructions 1106 configured to operate according to one or more of the principles set forth herein.

In the illustrated embodiment 1100, the processor-executable computer instructions 1106 may be configured to perform a method 1108, such as the method 400 of FIG. 4, the method 600 of FIG. 6, and/or the method 1000 of FIG. 10, for example. In another embodiment, the processor-executable instructions 1104 may be configured to implement a system, such as the system 100 of FIG. 1, the system 200 of FIG. 2, and/or the system 800 of FIG. 8, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 12:
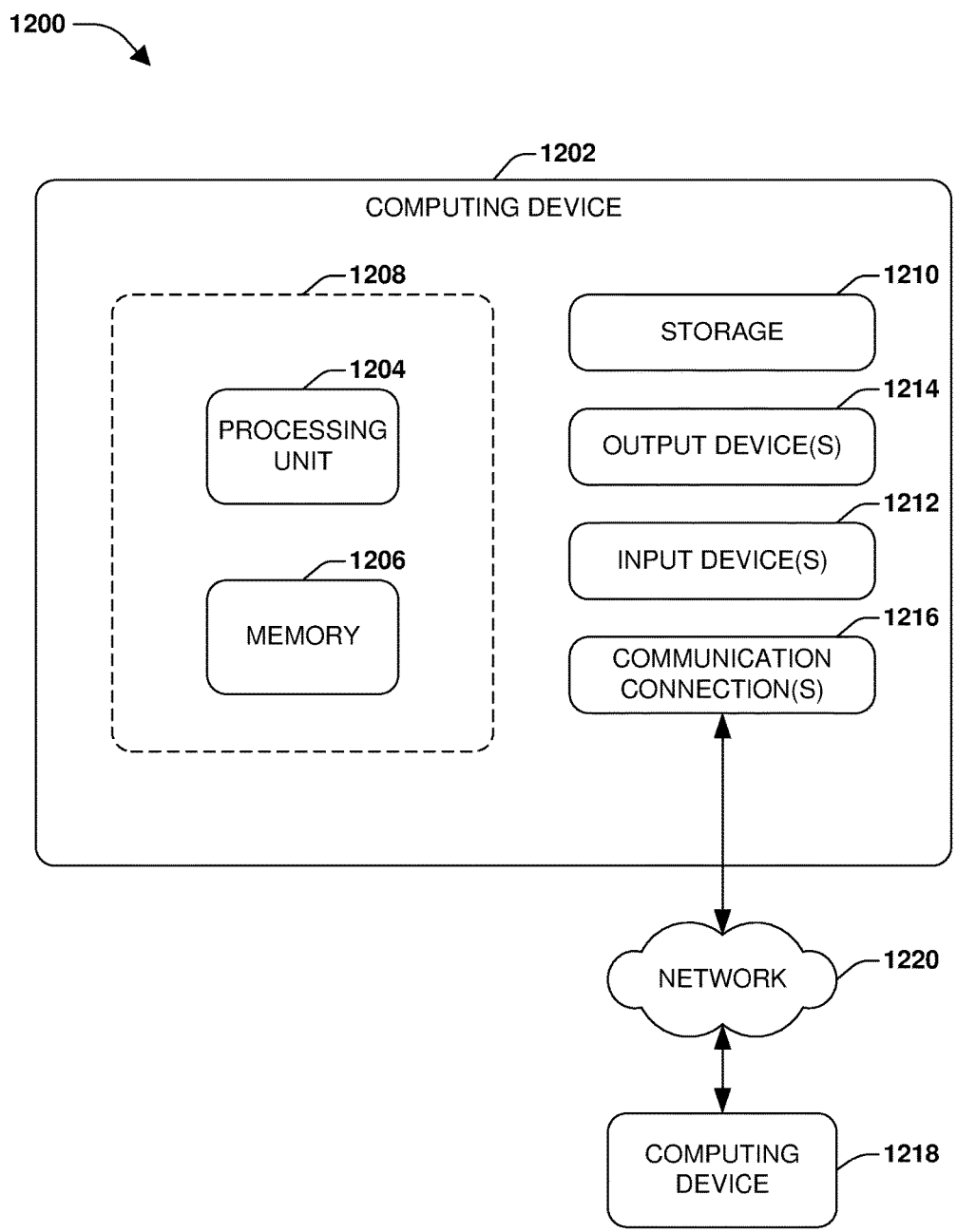
FIG. 12 illustrates an example, non-limiting computing environment where one or more of the aspects set forth herein are implemented, according to one or more embodiments.

FIG. 12 and the following discussion provide a description of a suitable computing environment to implement embodiments of one or more of the aspects set forth herein. The operating environment of FIG. 12 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 12 illustrates a system 1200 that may include a computing device 1202 configured to implement one or more embodiments provided herein. In one configuration, the computing device 1202 may include at least one processing unit 1204 and at least one memory 1206. Depending on the exact configuration and type of computing device, the at least one memory 1206 may be volatile, such as RAM, non-volatile, such as ROM, flash memory, etc., or a combination thereof. This configuration is illustrated in FIG. 12 by dashed line 1208.

In other embodiments, the device 1202 may include additional features or functionality. For example, the device 1202 may include additional storage such as removable storage or non-removable storage, including, but not limited to, magnetic storage, optical storage, etc. Such additional storage is illustrated in FIG. 12 by storage 1210. In one or more embodiments, computer readable instructions to implement one or more embodiments provided herein are in the storage 1210. The storage 1210 may store other computer readable instructions to implement an operating system, an application program, etc. Computer readable instructions may be loaded in the at least one memory 1206 for execution by the at least one processing unit 1204, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 1202 may include input device(s) 1212 such as keyboard, mouse, pen, voice input device, touch input device, infrared cameras, video input devices, or any other input device. Output device(s) 1214 such as one or more displays, speakers, printers, or any other output device may be included with the device 1202. The input device(s) 1212 and the output device(s) 1214 may be connected to the device 1202 via a wired connection, wireless connection, or any combination thereof. In one or more embodiments, an input device or an output device from another computing device may be used as the input device(s) 1212 and/or the output device(s) 1214 for the device 1202. Further, the device 1202 may include communication connection(s) 1216 to facilitate communications with one or more other devices, illustrated as a computing device 1218 coupled over a network 1220.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a hardware processor that executes the following computer executable components stored in a memory:
an identification manager component that generates profile data for a device based on the device denying authorization to access a hostile source and in response to a first authentication request, and
wherein the profile data includes at least data specific to a verifying user identity associated with the denial of the first authentication request;
an evaluation component that determines an expected characteristic of a second authentication request by the device to access the hostile source prior to receipt of the second authentication request, the expected characteristic is a prediction of a characteristic of the second authentication request,
wherein the evaluation component combines the profile data with other profile data to predict a port connection for the second authentication request; and
a validation component that, in response to the receipt of the second authentication request compares the characteristic of the second authentication request to the expected characteristic and, based on the comparison, controls access to the secure network, wherein a supplicant is not deployed on the device,
wherein the validation component requests an authentication of the device based on a detected state change between the device and the hostile source, wherein the request is the second authentication request,
wherein the validation component automatically denies authentication of the device with the hostile source based on a determination that the characteristic of the second authentication request matches the expected characteristic, and
wherein the validation component requests additional information that comprises a reauthentication to a port from the device based on a determination that the characteristic of the second authentication request does match the expected characteristic.

2. The system of claim 1, wherein the identification manager component generates the profile data based on usage characteristics of the device, and wherein the usage characteristics comprise a listening technology installed on the device.

3. The system of claim 1, wherein the identification manager component generates the profile data based on usage characteristics of the device, and wherein the usage characteristics comprise a location.

4. The system of claim 1, wherein the identification manager component generates the profile data based on usage characteristics of the device, and wherein the usage characteristics comprise an Internet protocol address.

5. The system of claim 1, wherein the identification manager component generates the profile data based on usage characteristics of the device, and wherein the usage characteristics comprise a device type.

6. The system of claim 1, wherein the identification manager component generates the profile data based on usage characteristics of the device, and wherein the usage characteristics comprise an access history for the device.

7. A method, comprising:
generating, by a system comprising a processor, a profile for an endpoint based on a characteristic observed during a non-successful attempt by the endpoint to access a hostile source,
wherein the non-successful attempt is in response to a first authentication request, and,
wherein the profile includes at least data specific to a verifying user identity associated with a denial of the first authentication request, and
wherein a supplicant is not deployed on the endpoint;
determining, by the system, an expected characteristic for another attempt by the endpoint to access the hostile source, the other attempt is a future attempt, and the expected characteristic is a prediction of a characteristic of the other authentication request, wherein the determining includes combining profile data with other profile data to predict a port connection for the other authentication request;
comparing, by the system, a characteristic of the other attempt by the endpoint to access the hostile source with the expected characteristic; and
selectively controlling, by the system, access to the hostile source by the endpoint as a result of the comparing,
wherein the validation component requests an authentication of a device based on a detected state change between the device and the secure network, wherein the request is the other authentication request, and wherein the validation component requests additional information that comprises a reauthentication to a port from the device based on a determination that the characteristic of the second authentication request does match the expected characteristic; and
wherein the selectively controlling access comprises automatically denying based on a determination that the characteristic of the other attempt matches the expected characteristic.

8. The method of claim 7, wherein the observed characteristic and the expected characteristic are a same characteristic.

9. The method of claim 7, wherein the observed characteristic and the expected characteristic are different characteristics.

10. The method of claim 7, further comprising generating layer-2 802.1X extensible authentication protocol responses and requests in place of the supplicant.

11. A computer-readable storage device storing executable instructions that, in response to execution, cause a system comprising a processor to perform operations, comprising:
generating profile data for a device based on the device being denied access to a hostile source in response to a first authentication request, and
wherein the profile data includes at least data specific to a verifying user identity associated with the denial of the first authentication request;
determining an expected characteristic of a second authentication request by the device to access the hostile source, the expected characteristic is a prediction of a characteristic of the second authentication request, wherein the determining includes combining the profile data with other profile data to predict a port connection for the second authentication request;
after receipt of the second authentication request, comparing the characteristic of the second authentication request to the expected characteristic; and controlling access to the secure network based on the comparison, wherein a supplicant is not deployed on the device, wherein controlling access includes:
- wherein the second authentication request is made based on a detected state change between the device and the secure network, and
- operative to, upon a determination that the characteristic of the second authentication request does match the expected characteristic, request additional information from the device, wherein the additional information comprises a reauthentication to a port; and
- upon a determination that the characteristic of the second authentication request matches the expected characteristic, automatically denying the device with the hostile source.

12. The computer-readable storage device of claim 11, wherein the profile data is generated based on usage characteristics of the device, and wherein the usage characteristics comprise a listening technology installed on the device.

13. The computer-readable storage device of claim 11, wherein the profile data is generated based on usage characteristics of the device, and wherein the usage characteristics comprise a location.

14. The computer-readable storage device of claim 11, wherein the profile data is generated based on usage characteristics of the device, and wherein the usage characteristics comprise an Internet protocol address.

15. The computer-readable storage device of claim 11, wherein the profile data is generated based on usage characteristics of the device, and wherein the usage characteristics comprise a device type.

16. The computer-readable storage device of claim 11, wherein the profile data is generated based on usage characteristics of the device, and wherein the usage characteristics comprise an access history for the device.

* * * * *